United States Patent
Hayashi et al.

(10) Patent No.: US 12,162,459 B2
(45) Date of Patent: Dec. 10, 2024

(54) DRIVING ASSISTANCE DEVICE FOR VEHICLE

(71) Applicant: SUBARU CORPORATION, Tokyo (JP)

(72) Inventors: Toshihiro Hayashi, Tokyo (JP); Daiki Koike, Tokyo (JP); Yuya Innami, Tokyo (JP); Masatoshi Minakawa, Tokyo (JP); Ryo Fukuhara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 253 days.

(21) Appl. No.: 17/849,205

(22) Filed: Jun. 24, 2022

(65) Prior Publication Data

US 2023/0001895 A1 Jan. 5, 2023

(30) Foreign Application Priority Data

Jul. 5, 2021 (JP) .................................. 2021-111810

(51) Int. Cl.
*B60T 8/172* (2006.01)
*B60T 8/32* (2006.01)

(52) U.S. Cl.
CPC ................. *B60T 8/172* (2013.01); *B60T 8/32* (2013.01); *B60T 2220/04* (2013.01)

(58) Field of Classification Search
CPC ..... B60T 8/32; B60T 8/00; B60T 8/17; B60L 7/26; B60L 9/22; B60W 30/09; F02D 41/065
See application file for complete search history.

(56) References Cited

U.S. PATENT DOCUMENTS

| | | | | |
|---|---|---|---|---|
| 5,984,433 A | * | 11/1999 | Stumpe | B60T 8/00 303/155 |
| 2008/0093916 A1 | * | 4/2008 | Negoro | B60L 9/22 303/3 |
| 2016/0297415 A1 | * | 10/2016 | Kato | F02D 41/065 |
| 2017/0259793 A1 | * | 9/2017 | Ohmori | B60W 30/09 |
| 2018/0086209 A1 | * | 3/2018 | Jeon | B60T 8/17 |
| 2018/0326867 A1 | * | 11/2018 | Yoneda | B60L 7/26 |
| 2021/0276534 A1 | * | 9/2021 | Maruyama | B60T 8/17 |

FOREIGN PATENT DOCUMENTS

JP 2014-109989 A 6/2014

* cited by examiner

*Primary Examiner* — Yuri Kan
(74) *Attorney, Agent, or Firm* — Rimon P.C.

(57) ABSTRACT

A driving assistance device for a vehicle includes a traveling environment recognizer, a braking force learner, and a braking force complementer. The traveling environment recognizer is configured to recognize traveling environment information related to an outside of the vehicle. The braking force learner is configured to, in a case where a driver who drives the vehicle has started a brake operation against a braking target recognized ahead based on the traveling environment information before a timing set based on a correlation between the vehicle and the braking target, acquire a braking force characteristic learning value based on a braking force generated from start to end of braking performed by the brake operation. The braking force complementer is configured to, in a case where the driver has started the brake operation after the set timing, complement the braking force based on the braking force characteristic learning value.

13 Claims, 10 Drawing Sheets

DRIVING ASSISTANCE DEVICE FOR VEHICLE

CROSS-REFERENCE TO RELATED APPLICATIONS

The present application claims priority from Japanese Patent Application No. 2021-111810 filed on Jul. 5, 2021, the entire contents of which are hereby incorporated by reference.

BACKGROUND

The disclosure relates to a driving assistance device that can perform braking control for a vehicle against an obstacle such as a preceding vehicle.

In the field of vehicles such as automobiles, driving assistance devices that assist driving operations of drivers have been put into practical use to reduce loads on the driving operations of the drivers and improve safety. In this type of driving assistance device, driving modes include, for example, a manual driving mode in which steering, acceleration, and deceleration are performed in response to a voluntary driving operation of a driver, a driving assistance mode in which steering assistance control and acceleration/deceleration control are performed under the precondition that the driver voluntarily performs the driving operation, and a driving assistance mode in which the vehicle travels without the driving operation of the driver (so-called autonomous driving mode).

The driving assistance control in each driving assistance mode is basically achieved by an adaptive cruise control (ACC) function and an active lane keep centering (ALKC) function. With this driving assistance control, the vehicle can automatically travel along a traveling lane while keeping a distance from a preceding vehicle.

As a technology related to active safety of the driving assistance device, the following technology is put into practical use. When an obstacle such as a vehicle or a pedestrian is recognized ahead of a target vehicle in each driving mode so that an emergency stop is expected, autonomous emergency braking (AEB: collision damage reduction braking) control is performed against the obstacle as interrupt control to perform deceleration so that the relative speed between the target vehicle and the obstacle reaches zero.

As a technology related to braking control for prompting the driver to drive safely in a stage prior to the active safety, Japanese Unexamined Patent Application Publication (JP-A) No. 2014-109989 discloses the following technology as an example. A braking start TTC is recorded for each driver based on information input from a driver identifier, a vehicle traveling information acquirer, and a TTC calculator. A default TTC is calculated by learning for each driver based on the recorded braking start TTC.

Vehicle control (braking control) is started by operating a vehicle controller based on a control start TTC determined based on the default TTC.

SUMMARY

An aspect of the disclosure provides a driving assistance device for a vehicle. The driving assistance device includes a traveling environment recognizer, a braking force learner, and a braking force complementer. The traveling environment recognizer is configured to recognize traveling environment information related to an outside of the vehicle. The braking force learner is configured to, in a case where a driver who drives the vehicle has started a brake operation against a braking target recognized ahead based on the traveling environment information before a timing set based on a correlation between the vehicle and the braking target, acquire a braking force characteristic learning value based on a braking force generated from start to end of braking performed by the brake operation. The braking force complementer is configured to, in a case where the driver has started the brake operation after the set timing, complement the braking force generated based on the braking force characteristic learning value.

An aspect of the disclosure provides a driving assistance device for a vehicle. The driving assistance device includes circuitry. The circuitry is configured to recognize traveling environment information related to an outside of the vehicle. The circuitry is configured to, in a case where a driver who drives the vehicle has started a brake operation against a braking target recognized ahead based on the traveling environment information before a timing set based on a correlation between the vehicle and the braking target, acquire a braking force characteristic learning value based on a braking force generated from start to end of braking performed by the brake operation. The circuitry is configured to, in a case where the driver has started the brake operation after the set timing, complement the braking force based on the braking force characteristic learning value.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

In a case where the technology disclosed in JP-A No. 2014-109989 is applied during the manual driving mode, there is a possibility that the braking is started at an unexpected timing for the driver and the driver has discomfort.

In a case where the timing to depress a brake pedal is late during the manual driving mode, for example, because the driver is inattentive, there is a possibility that the braking force is insufficient and unexpected emergency braking control occurs.

It is desirable to provide a driving assistance device that can generate an appropriate braking force for a vehicle in a case where the timing to depress a brake pedal by a driver is late during a manual driving mode.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
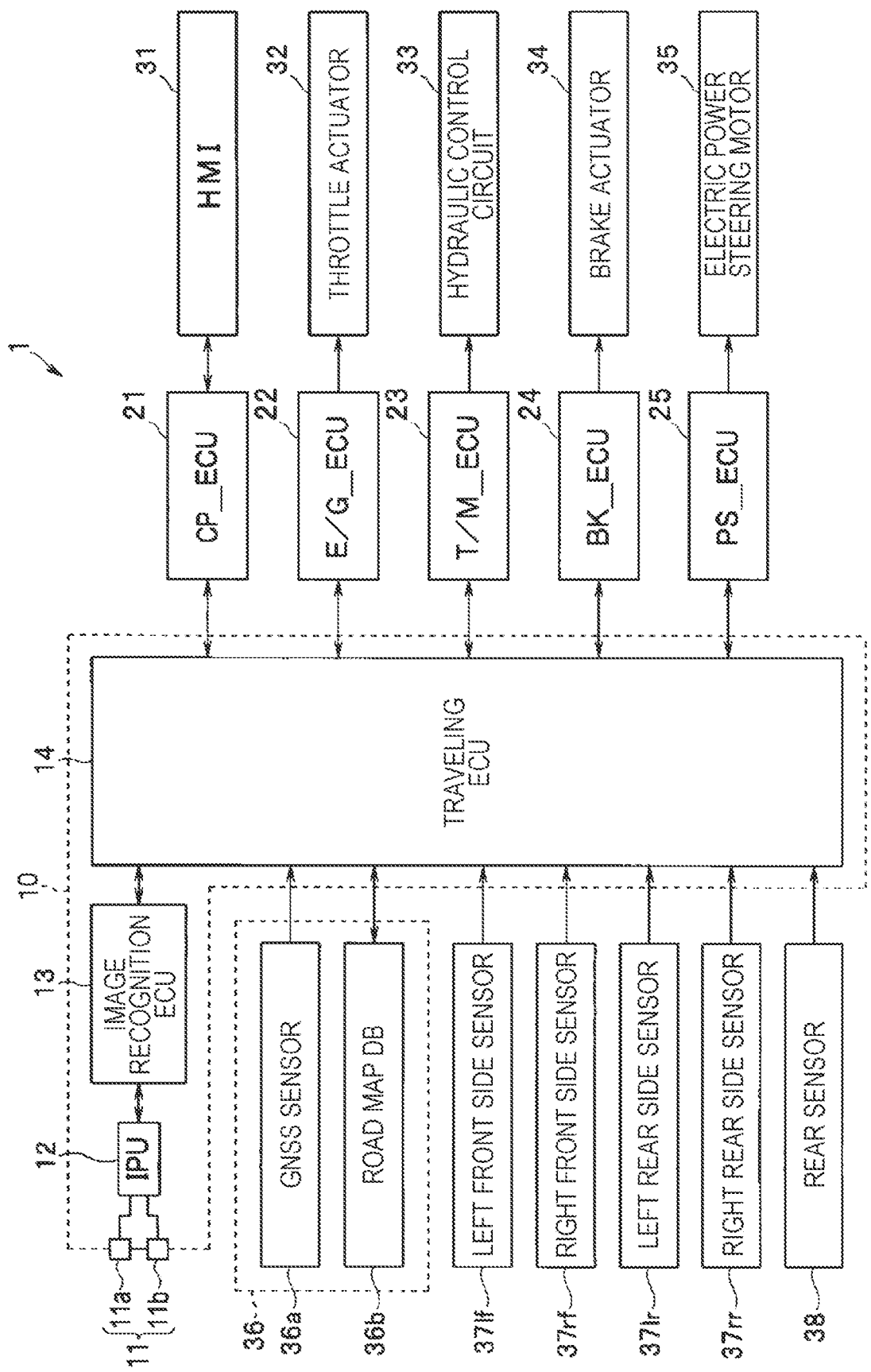
FIG. 1 is an overall configuration diagram of a driving assistance device according to an embodiment of the disclosure.

FIG. 1 is an overall configuration diagram of a driving assistance device 1 according to the embodiment. As illustrated in FIG. 1, the driving assistance device 1 includes, for example, a camera unit 10 fixed to an upper central part of a front area in a cabin of a vehicle (target vehicle) M.

The camera unit 10 includes a stereo camera 11, an image processing unit (IPU) 12, an image recognition unit (image recognition ECU) 13, and a traveling control unit (traveling ECU) 14.

The stereo camera 11 includes a main camera 11a and a subcamera 11b. For example, the main camera 11a and the subcamera 11b are bilaterally symmetrical across the center in a vehicle width direction. For example, the main camera 11a and the subcamera 11b each include a CMOS, and perform stereoscopic imaging for a traveling environment in an external forward area Af (see FIG. 2) from different viewpoints in every predetermined synchronous imaging period.

The IPU 12 performs predetermined image processing for traveling environment images captured by the stereo camera 11 to detect various target edges of, for example, three-dimensional objects and lane lines on a road surface in the images. The IPU 12 obtains distance information from positional deviation amounts of corresponding edges in the right and left images, and generates image information including the distance information (distance image information).

The image recognition ECU 13 obtains, based on the distance image information received from the IPU 12, a road curvature [1/m] between right and left lane lines of a road where the target vehicle M is traveling (target vehicle traveling road) and a width between the right and left lane lines (lane width). Various methods are known to obtain the road curvature and the lane width. For example, the image recognition ECU 13 obtains the road curvature in such a manner that right and left lane lines are recognized by binarization using a difference in brightness levels based on traveling environment information and the curvatures of the right and left lane lines are obtained for each predetermined section by using a curve approximation expression based on the least-square method. The image recognition ECU 13 calculates the lane width from a difference in the curvatures of the right and left lane lines.

The image recognition ECU 13 calculates, based on the curvatures of the right and left lane lines and the lane width, a lane center and a target-vehicle lateral positional deviation that is a distance from the lane center to the center of the target vehicle M in the vehicle width direction.

The image recognition ECU 13 performs predetermined pattern matching for the distance image information to recognize three-dimensional objects such as guardrails along the road, curbstones, and surrounding vehicles. In the recognition of three-dimensional objects, the image recognition ECU 13 recognizes, for example, types of the three-dimensional objects, heights of the three-dimensional objects, distances from the three-dimensional objects, speeds of the three-dimensional objects, and relative speeds Vrel between the three-dimensional objects and the target vehicle M.

Various types of information recognized by the image recognition ECU 13 are output to the traveling ECU 14 as traveling environment information.

The image recognition ECU 13 recognizes traveling environment information related to the outside of the vehicle in cooperation with the stereo camera 11 and the IPU 12. In one embodiment, the image recognition ECU 13 may serve as a "traveling environment recognizer".

The traveling ECU 14 is a control unit that centrally controls the driving assistance device 1.

Various control units such as a cockpit control unit (CP_ECU) 21, an engine control unit (E/G_ECU) 22, a transmission control unit (T/M_ECU) 23, a brake control unit (BK_ECU) 24, and a power steering control unit (PS_ECU) 25 are coupled to the traveling ECU 14 via an internal communication network such as a controller area network (CAN).

Various sensors such as a locator unit 36, a right front side sensor 37rf, a left front side sensor 371f, a right rear side sensor 37rr, a left rear side sensor 371r, and a rear sensor 38 are coupled to the traveling ECU 14.

A human-machine interface (HMI) 31 disposed near a driver's seat is coupled to the CP_ECU 21. For example, the HMI 31 includes a switch for giving instructions to execute various types of driving assistance control, a mode selection switch for switching driving assistance modes, a steering touch sensor that detects a steering wheel holding state of a driver, a driver monitoring system (DMS) that performs facial authentication of the driver and detects a line of sight, a touch panel display, a combination of meters, and a loudspeaker.

In response to a control signal from the traveling ECU 14, the CP_ECU 21 notifies the driver as appropriate by display and sound through the HMI 31 about various types of information related to, for example, various alerts for a preceding vehicle, the status of the driving assistance control, and the traveling environment of the target vehicle M. The CP_ECU 21 outputs, to the traveling ECU 14, various types of information input by the driver through the HMI 31, such as ON/OFF operations on various types of driving assistance control.

For example, a throttle actuator 32 of an electronically controlled throttle is coupled to an output side of the E/G_ECU 22. Various sensors such as an accelerator sensor (not illustrated) are coupled to an input side of the E/G_ECU 22.

The E/G_ECU 22 controls drive of the throttle actuator 32 based on, for example, either one of a control signal from the traveling ECU 14 and detection signals from various sensors. Thus, the E/G_ECU 22 adjusts the intake amount of an engine to generate desired engine power. The E/G_ECU 22 outputs, to the traveling ECU 14, signals of an accelerator operation amount and the like detected by various sensors.

A hydraulic control circuit 33 is coupled to an output side of the T/M_ECU 23. Various sensors such as a shift position sensor (not illustrated) are coupled to an input side of the T/M_ECU 23. The T/M_ECU 23 performs hydraulic control for the hydraulic control circuit 33 based on, for example, a signal of an engine torque estimated by the E/G_ECU 22 and detection signals from various sensors. Thus, the T/M_ECU 23 changes the engine power at a desired speed ratio by operating, for example, friction engagement elements and pulleys in an automatic transmission. The T/M_ECU 23 outputs, to the traveling ECU 14, signals of a shift position and the like detected by various sensors.

A brake actuator 34 for adjusting brake fluid pressures to be output to brake wheel cylinders in individual wheels is coupled to an output side of the BK_ECU 24. Various sensors such as a brake pedal sensor, a yaw rate sensor, a longitudinal acceleration sensor, and a vehicle speed sensor (not illustrated) are coupled to an input side of the BK_ECU 24.

The BK_ECU 24 controls drive of the brake actuator 34 based on either one of a control signal from the traveling ECU 14 and detection signals from various sensors. Thus, the BK_ECU 24 generates, for the wheels as appropriate, braking forces for forcible braking control and yaw rate control on the target vehicle M. The BK_ECU 24 outputs, to the traveling ECU 14, signals of a brake operation status, a yaw rate, a longitudinal acceleration, a vehicle speed (target vehicle speed), and the like detected by various sensors.

An electric power steering motor 35 for applying a steering torque of a rotational force from a motor to a steering mechanism is coupled to an output side of the PS_ECU 25. Various sensors such as a steering torque sensor and a steering angle sensor are coupled to an input side of the PS_ECU 25.

The PS_ECU 25 controls drive of the electric power steering motor 35 based on either one of a control signal from the traveling ECU 14 and detection signals from various sensors. Thus, the PS_ECU 25 generates the steering torque for the steering mechanism. The PS_ECU 25 outputs, to the traveling ECU 14, signals of a steering torque, a steering angle, and the like detected by various sensors.

The locator unit 36 includes a GNSS sensor 36a and a high-accuracy road map database (road map DB) 36b.

The GNSS sensor 36a measures the position (latitude, longitude, and altitude) of the target vehicle M by receiving positioning signals from a plurality of positioning satellites.

The road map DB 36b is a large-capacity storage medium such as an HDD, and stores high-accuracy road map information (dynamic map). For example, the road map DB 36b stores lane width data, lane center position coordinate data, lane azimuth angle data, and speed limits as lane data for use in autonomous driving. The stored lane data includes pieces of data for several-meter intervals in each lane on the road map. The road map DB stores information on various facilities and parking lots. Based on, for example, a request signal from the traveling ECU 14, the road map DB 36b outputs road map information in a set range around the target vehicle position measured by the GNSS sensor 36a to the traveling ECU 14 as traveling environment information.

The road map DB 36b recognizes traveling environment information related to the outside of the vehicle in cooperation with the GNSS sensor 36a. In one embodiment, the road map DB 36b may serve as a "traveling environment recognizer".

Examples of the right front side sensor 37rf and the left front side sensor 37lf include millimeter wave radars. For example, the right front side sensor 37rf and the left front side sensor 37lf are disposed on right and left sides of a front bumper. The right front side sensor 37rf and the left front side sensor 37lf detect, as traveling environment information, three-dimensional objects in right and left obliquely forward and side areas Arf and Alf around the target vehicle M (see FIG. 2). Those areas are difficult to recognize from an image captured by the stereo camera 11.

Examples of the right rear side sensor 37rr and the left rear side sensor 37lr include millimeter wave radars. For example, the right rear side sensor 37rr and the left rear side sensor 37lr are disposed on right and left sides of a rear bumper. The right rear side sensor 37rr and the left rear side sensor 37lr detect, as traveling environment information, three-dimensional objects in right and left obliquely rearward and side areas Arr and Alr around the target vehicle M (see FIG. 2). Those areas are difficult to recognize by the right front side sensor 37rf and the left front side sensor 37lf.

Each millimeter wave radar detects the three-dimensional object such as a vehicle traveling side by side by outputting a radio wave and analyzing the reflected wave from the object. For example, each radar detects a width of the three-dimensional object, a position of a representative point of the three-dimensional object (position relative to the target vehicle M), and a speed of the three-dimensional object as information related to the three-dimensional object.

The right front side sensor 37rf, the left front side sensor 37lf, the right rear side sensor 37rr, and the left rear side sensor 37lr recognize traveling environment information related to the outside of the vehicle. In one embodiment, the right front side sensor 37rf, the left front side sensor 37lf, the right rear side sensor 37rr, and the left rear side sensor 37lr may serve as a "traveling environment recognizer".

Examples of the rear sensor 38 include a sonar. For example, the rear sensor 38 is disposed on the rear bumper. The rear sensor 38 detects three-dimensional objects in a rearward area Ar behind the target vehicle M (see FIG. 2) as traveling environment information. This area is difficult to recognize by the right rear side sensor 37rr and the left rear side sensor 37lr.

The rear sensor 38 recognizes traveling environment information related to the outside of the vehicle. In one embodiment, the rear sensor 38 may serve as a "traveling environment recognizer".

Figure 2:
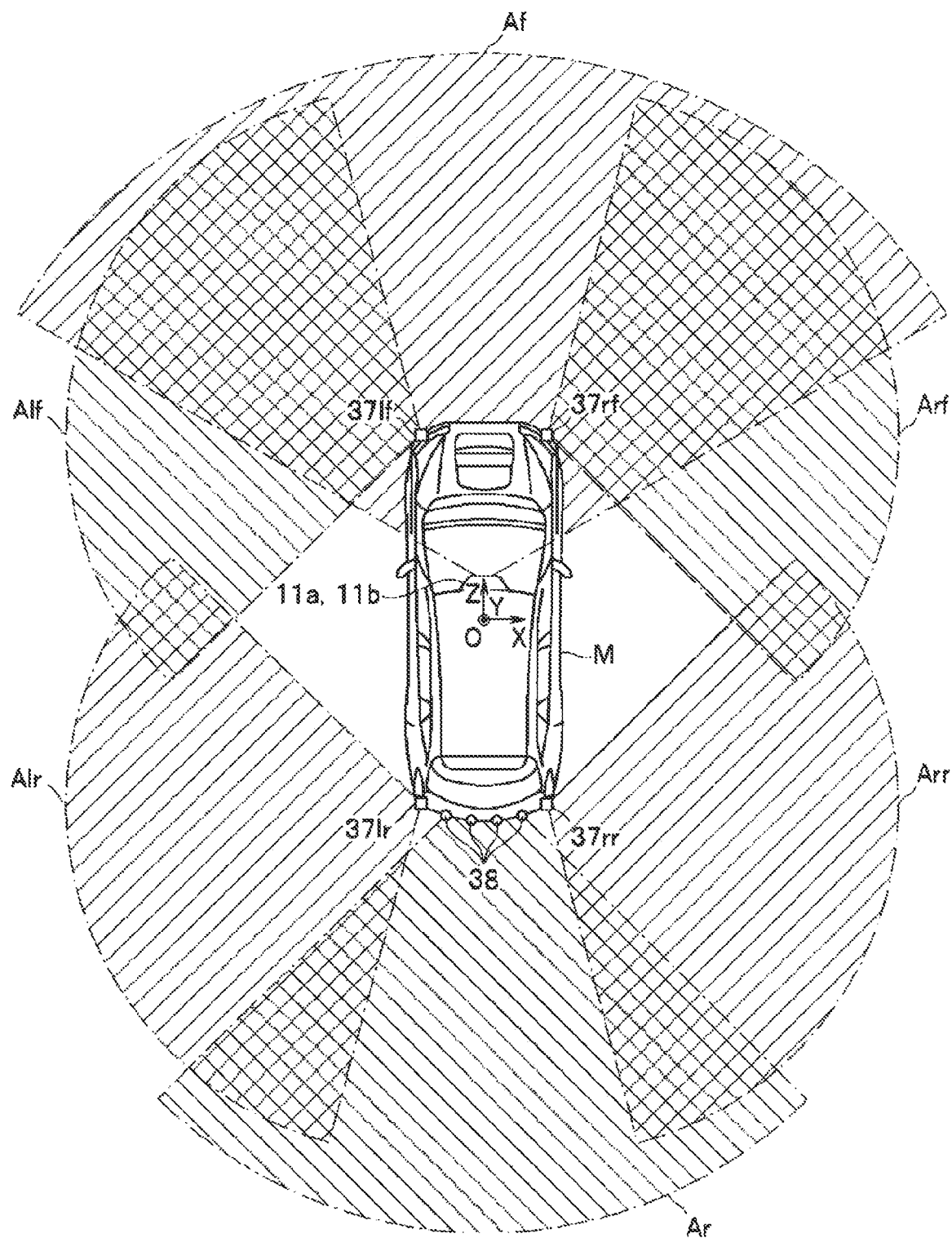
FIG. 2 is an explanatory diagram illustrating monitoring areas of a stereo camera, a radar, and a sonar.

Coordinates of the external targets in the traveling environment information recognized by the image recognition ECU 13, the traveling environment information recognized by the locator unit 36, the traveling environment information recognized by the right front side sensor 37rf, the traveling environment information recognized by the left front side sensor 37lf, the traveling environment information recognized by the right rear side sensor 37rr, the traveling environment information recognized by the left rear side sensor 37lf, and the traveling environment information recognized by the rear sensor 38 are converted by the traveling ECU 14 into coordinates in a three-dimensional coordinate system having its origin at the center of the target vehicle M (see FIG. 2).

The traveling ECU 14 has driving modes such as a manual driving mode, a first traveling control mode, a second traveling control mode, and a limp home mode. The traveling ECU 14 can selectively switch the driving modes based on, for example, a status of operation on the mode selection switch of the HMI 31.

The manual driving mode is a driving mode in which the driver is assumed to hold the steering wheel. In this driving mode, the target vehicle M travels by driving operations of the driver, such as a steering operation, an accelerator operation, and a brake operation.

The first traveling control mode is also a driving mode in which the driver is assumed to hold the steering wheel. That is, the first traveling control mode is a so-called semi-autonomous driving mode in which the target vehicle M travels along a target traveling route by combining, for example, adaptive cruise control (ACC), active lane keep centering (ALKC) control, and active lane keep bouncing control as appropriate through control of, for example, the E/G_ECU 22, the BK_ECU 24, and the PS_ECU 25 while reflecting the driving operations of the driver.

The adaptive cruise control is basically performed based on traveling environment information input from the image recognition ECU 13. For example, the adaptive cruise control is performed based on preceding vehicle information in the traveling environment information from the image recognition ECU 13.

The active lane keep centering control and the active lane keep bouncing control are basically performed based on traveling environment information input from at least one of the image recognition ECU 13 or the locator unit 36. For example, the active lane keep centering control and the active lane keep bouncing control are performed based on lane line information in the traveling environment information from either one of the image recognition ECU 13 and the locator unit 36.

The second traveling control mode is an autonomous driving mode in which the target vehicle M travels along a target route (route map information) by combining, for example, the adaptive cruise control, the active lane keep centering control, and the active lane keep bouncing control as appropriate through control of, for example, the E/G_ECU 22, the BK_ECU 24, and the PS_ECU 25 without the steering wheel holding by the driver, the accelerator operation, and the brake operation.

In the limp home mode, the target vehicle M is automatically stopped, for example, at a side strip when the target vehicle M traveling in the second traveling control mode cannot continue the traveling in this mode and the driver cannot take over the driving operation (that is, the mode cannot be switched to either one of the manual driving mode and the first traveling control mode).

In each of the driving modes described above, the traveling ECU 14 performs autonomous emergency braking (AEB: collision damage reduction braking) control as appropriate against an obstacle such as a preceding vehicle traveling on the target vehicle traveling road and having a strong possibility of colliding with the target vehicle M.

For example, the traveling ECU 14 extracts, based on traveling environment information, a three-dimensional object such as a preceding vehicle or a stopped vehicle ahead of the target vehicle M on the target vehicle traveling road, and a three-dimensional object such as a bicycle or a pedestrian entering an area ahead of the target vehicle M on the target vehicle traveling road from the side of the road.

The traveling ECU 14 determines a possibility of collision between the target vehicle M and each extracted three-dimensional object. Among the three-dimensional objects having a strong possibility of collision with the target vehicle M, the traveling ECU 14 sets the three-dimensional object closest to the target vehicle M as a braking target Trg (obstacle) for emergency braking control.

The traveling ECU 14 calculates a time-to-collision TTC (=(relative distance to braking target)/(relative speed to braking target)) of the braking target Trg.

When the time-to-collision TTC is equal to or shorter than a preset first threshold Tth1, the traveling ECU 14 alerts the driver to avoid collision with the braking target Trg. The alert may include alert braking (light braking) using a preset deceleration a1 in addition to an audio or visual alert.

When the driver does not perform any appropriate operation to avoid collision despite the alert and the time-to-collision TTC is equal to or shorter than a preset second threshold Tth2 (Tth2<Tth1), the traveling ECU 14 executes emergency braking (hard braking) of the target vehicle M against the braking target Trg by using a preset deceleration a2 (a2>a1).

The alert control and the emergency braking control are applied not only to, for example, the first driving assistance mode and the second driving assistance mode but also to the manual driving mode.

When determination is made that there is difficulty in avoiding collision with the obstacle by the emergency braking control, the traveling ECU 14 may perform emergency steering control for avoiding the collision with the obstacle in place of or in combination with the emergency braking control.

When the driver's brake operation against the braking target Trg ahead is late due to carelessness such as inattentive driving in the manual driving mode, the traveling ECU 14 performs braking force assisting control (braking force complementing control) to secure the safety. For example, the braking force assisting control is performed by complementing the brake fluid pressure generated by the brake actuator 34 through depression of the brake pedal by the driver.

The braking force assisting control is performed in consideration of the voluntary driving operation of the driver in the manual driving mode. Therefore, the traveling ECU 14 performs the brake fluid pressure assisting control as appropriate exclusively when the driver's brake operation is performed in the manual driving mode.

When the driver's brake operation is not performed against the obstacle ahead in the manual driving mode and the target vehicle M has a possibility of colliding with this obstacle, the emergency braking control is forcibly performed.

Prior to the brake fluid pressure assisting control, the traveling ECU 14 acquires a braking force characteristic learning value on a brake operation performed by the driver at an appropriate timing against the obstacle (braking target Trg) recognized ahead based on traveling environment information. For example, when the driver has started the brake operation before a timing preset based on a correlation between the target vehicle M and the braking target Trg, the traveling ECU 14 acquires, as the braking force characteristic learning value, a learning value of the characteristic of the brake fluid pressure (hereinafter referred to as "brake fluid pressure learning value") and a learning value of the characteristic of a jerk of the brake fluid pressure (hereinafter referred to as "fluid pressure jerk learning value") based on transition of the brake fluid pressure from start to end of braking performed by the brake operation.

For example, the traveling ECU 14 determines that the brake operation has been performed at the appropriate timing by the driver when a time-to-collision TTC of the target at the start of the driver's brake operation is longer than a preset threshold TTCx_range (TTCx_range>Tth1).

For example, it is desirable that the traveling ECU 14 acquire the brake fluid pressure learning value for each range of a relative speed Vrel between the target vehicle M and the braking target at the timing when the driver has started the brake operation. For example, it is desirable that the traveling ECU 14 acquire the brake fluid pressure learning value and the fluid pressure jerk learning value for each driver who has undergone facial recognition by the driver monitoring system of the HMI 31.

When the driver has started the brake operation after the appropriate timing, the traveling ECU 14 complements, based on the brake fluid pressure learning value, the brake fluid pressure generated from the start to the end of the braking performed by the brake operation. That is, the traveling ECU 14 complements the brake fluid pressure in the manual driving mode on the premise that the driver's brake operation has been performed even in a case where the timing of the brake operation is late, for example, because the driver is inattentive.

It is desirable that the brake fluid pressure be complemented minimally in consideration of driver's intention. Therefore, the traveling ECU 14 stores an ideal brake fluid pressure characteristic as an ideal braking force characteristic preset based on experiment, simulation, or the like. When a brake fluid pressure of the ideal brake fluid pressure characteristic (hereinafter referred to as "ideal brake fluid pressure") is relatively lower than the brake fluid pressure learning value, the traveling ECU 14 complements the brake fluid pressure based on the ideal brake fluid pressure in place of the brake fluid pressure learning value.

It is desirable that the ideal brake fluid pressure characteristic be set for each preset range of the relative speed Vrel between the target vehicle M and the braking target.

In one embodiment, the traveling ECU 14 may serve as a "braking force learner", a "braking force complementer", and a "storage".

Figure 3:
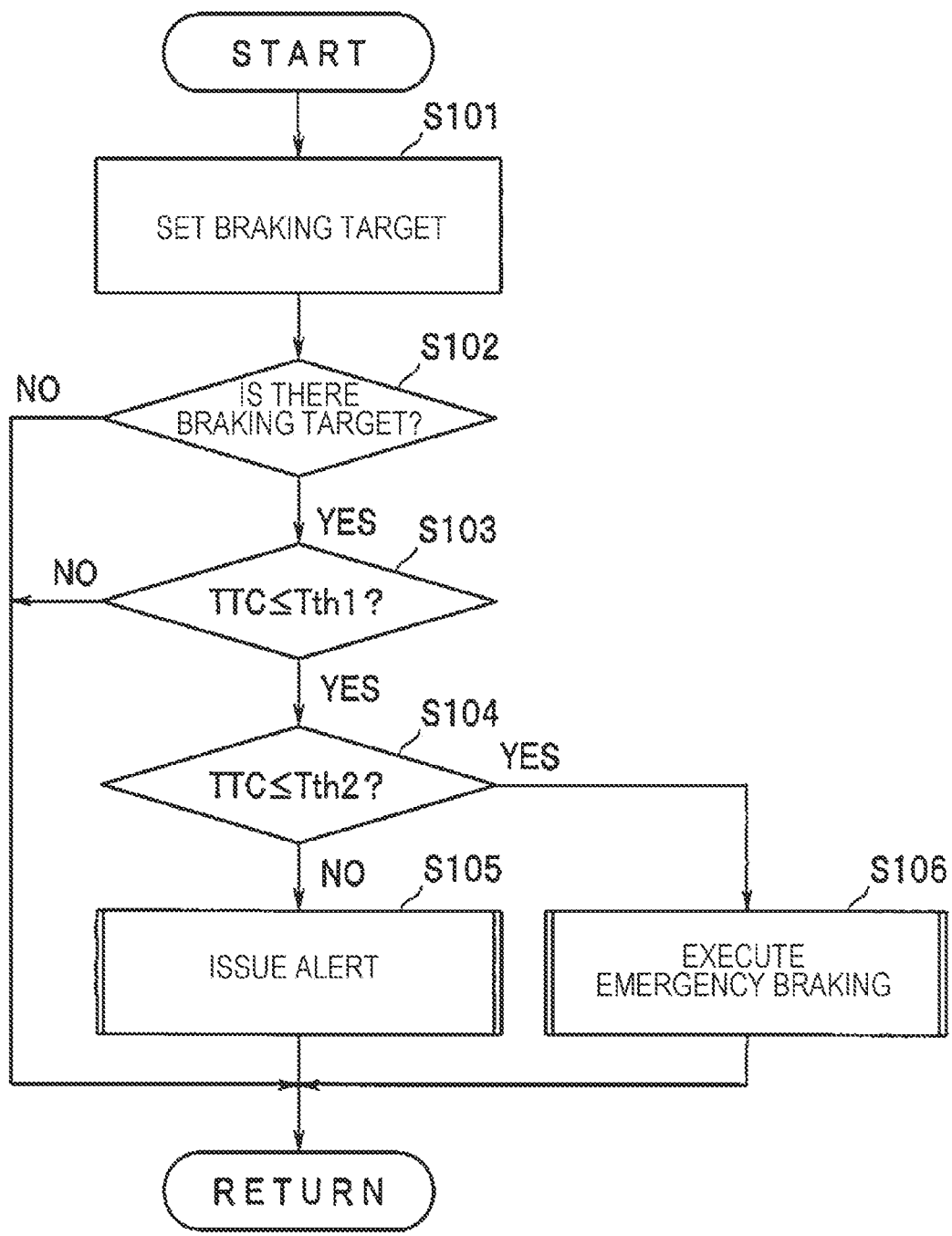
FIG. 3 is a flowchart illustrating an emergency braking control routine.

Next, the emergency braking control to be executed by the traveling ECU 14 is described with reference to a flowchart of an emergency braking control routine in FIG. 3. This routine is repeated at every set time.

When the routine is started, the traveling ECU 14 sets a braking target Trg for the emergency braking control based on traveling environment information. For example, when three-dimensional objects such as a preceding vehicle, a stopped vehicle, a bicycle, and a pedestrian having a strong possibility of collision with the target vehicle M are present ahead of the target vehicle M on the target vehicle traveling road, the traveling ECU 14 sets the three-dimensional object closest to the target vehicle M as the braking target Trg for the emergency braking control.

In Step S102, the traveling ECU 14 checks whether the braking target Trg is set ahead on the target vehicle traveling road.

When determination is made in Step S102 that the braking target Trg is not set ahead on the target vehicle traveling road, the traveling ECU 14 terminates the routine.

When determination is made in Step S102 that the braking target Trg is set ahead on the target vehicle traveling road, the traveling ECU 14 proceeds to Step S103 to check whether a time-to-collision TTC of the braking target Trg is equal to or shorter than the preset first threshold Tth1.

When determination is made in Step S103 that the time-to-collision TTC is longer than the first threshold, the traveling ECU 14 terminates the routine.

When determination is made in Step S103 that the time-to-collision TTC is equal to or shorter than the first threshold, the traveling ECU 14 proceeds to Step S104 to check whether the time-to-collision TTC is equal to or shorter than the preset second threshold Tth2.

When determination is made in Step S104 that the time-to-collision TTC is longer than the second threshold, the traveling ECU 14 proceeds to Step S105 to issue an alert about the braking target Trg through the CP_ECU 21, the BK_ECU 24, and the like, and then terminates the routine.

When determination is made in Step S104 that the time-to-collision TTC is equal to or shorter than the second threshold Tth2, the traveling ECU 14 proceeds to Step S106 to execute emergency braking against the braking target Trg through the BK_ECU 24 and the like, and then terminates the routine.

Figure 4:
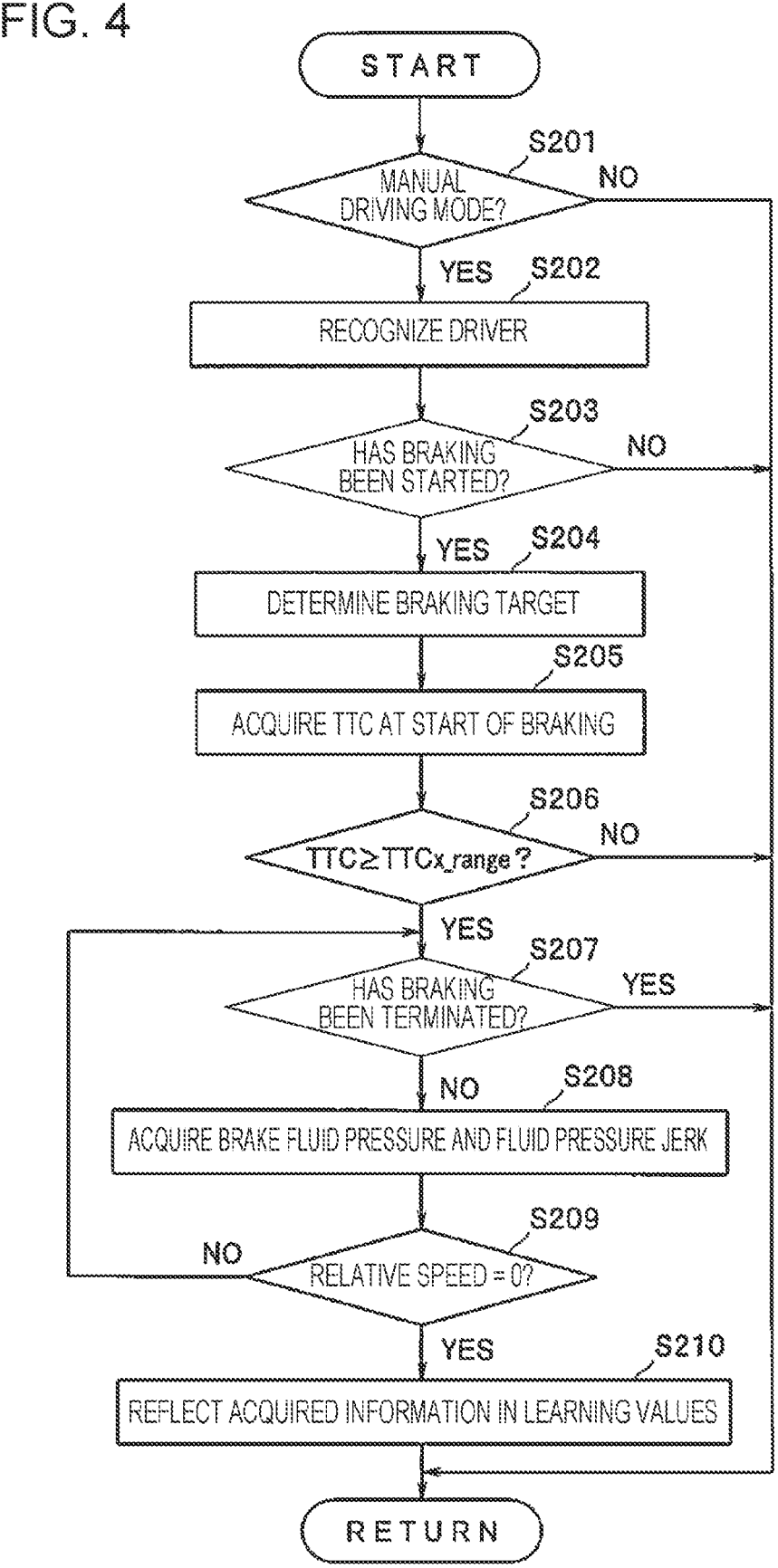
FIG. 4 is a flowchart illustrating a learning routine for brake fluid pressure characteristics on a driver's brake operation.

Next, the learning to be executed by the traveling ECU 14 about the brake fluid pressure characteristics on the driver's brake operation is described with reference to a flowchart illustrating a learning routine for the brake fluid pressure characteristics in FIG. 4. This routine is repeated at every set time.

When the routine is started, the traveling ECU 14 checks in Step S201 whether the current driving mode is the manual driving mode.

When determination is made in Step S201 that the current driving mode is a mode other than the manual driving mode, the traveling ECU 14 terminates the routine.

When determination is made in Step S201 that the current driving mode is the manual driving mode, the traveling ECU 14 proceeds to Step S202 to recognize the driver of the target vehicle M based on information from, for example, the driver monitoring system of the HMI 31.

In Step S203, the traveling ECU 14 checks whether a driver's brake operation has been started based on information from the brake pedal sensor and the like.

When determination is made in Step S203 that the driver's brake operation has not been started, the traveling ECU 14 terminates the routine.

When determination is made in Step S203 that the driver's brake operation has been started, the traveling ECU 14 proceeds to Step S204 to determine a braking target Trg of the driver's brake operation. For example, the traveling ECU 14 extracts, based on traveling environment information, a three-dimensional object such as a preceding vehicle or a stopped vehicle ahead of the target vehicle M on the target vehicle traveling road, and a three-dimensional object such as a bicycle or a pedestrian rushing out from the side of the road. The traveling ECU 14 determines a possibility of collision between the target vehicle M and each extracted three-dimensional object. Among the three-dimensional objects having a strong possibility of collision with the target vehicle M, the traveling ECU 14 sets the three-dimensional object closest to the target vehicle M as the braking target Trg of the driver's brake operation.

When the braking target is set in Step S204, the traveling ECU 14 acquires, in Step S205, a time-to-collision TTC at the start of the driver's brake operation against the braking target.

In Step S206, the traveling ECU 14 checks whether the time-to-collision TTC at the start of the brake operation is equal to or longer than the preset threshold TTCx_range.

When determination is made in Step S206 that the time-to-collision TTC at the start of the brake operation is shorter than the threshold TTCx_range, the traveling ECU 14 terminates the routine.

Figure 7:
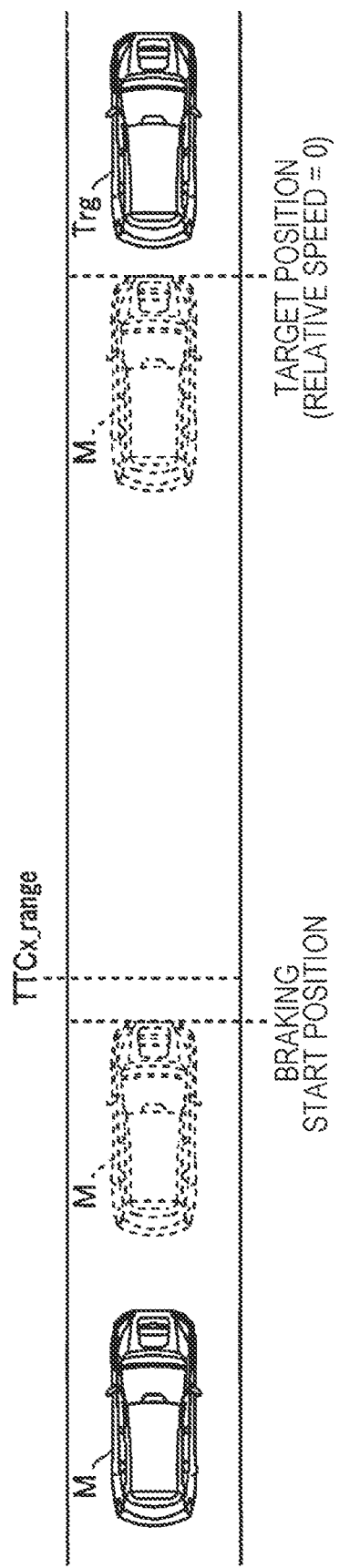
FIG. 7 is an explanatory diagram illustrating behavior of a vehicle during learning of the brake fluid pressure characteristics.

When determination is made in Step S206 that the time-to-collision TTC at the start of the brake operation is equal to or longer than the threshold TTCx_range (see FIG. 7), the traveling ECU 14 proceeds to Step S207 to check whether the driver's brake operation has been terminated.

When determination is made in Step S207 that the driver's brake operation has been terminated, the traveling ECU 14 terminates the routine.

When determination is made in Step S207 that the driver's brake operation has not been terminated, the traveling ECU 14 acquires a current brake fluid pressure and a jerk of the brake fluid pressure (fluid pressure jerk) as brake fluid pressure characteristics of the driver.

In Step S209, the traveling ECU 14 checks whether the relative speed Vrel between the target vehicle M and the braking target has reached "0".

When determination is made in Step S209 that the relative speed Vrel has not reached "0", the traveling ECU 14 returns to Step S207.

When determination is made in Step S209 that the relative speed Vrel has reached "0", the traveling ECU 14 proceeds to Step S210 to reflect, in the brake fluid pressure learning value and the fluid pressure jerk learning value, the brake fluid pressure and the fluid pressure jerk acquired from the start to the end of the braking, and then terminates the routine.

Next, the braking force assisting control to be executed by the traveling ECU 14 is described with reference to a braking force assisting control routine illustrated in FIG. 5. This routine is repeated at every set time.

When the routine is started, the traveling ECU 14 checks in Step S301 whether the current driving mode is the manual driving mode.

When determination is made in Step S301 that the current driving mode is a mode other than the manual driving mode, the traveling ECU 14 terminates the routine.

When determination is made in Step S301 that the current driving mode is the manual driving mode, the traveling ECU 14 proceeds to Step S302 to recognize the driver of the target vehicle M based on information from, for example, the driver monitoring system of the HMI 31.

In Step S303, the traveling ECU 14 checks whether a driver's brake operation has been started based on information from the brake pedal sensor and the like.

When determination is made in Step S303 that the driver's brake operation has not been started, the traveling ECU 14 terminates the routine.

When determination is made in Step S303 that the driver's brake operation has been started, the traveling ECU 14 proceeds to Step S304 to determine a braking target Trg of the driver's brake operation. For example, the traveling ECU 14 extracts, based on traveling environment information, a three-dimensional object such as a preceding vehicle or a stopped vehicle ahead of the target vehicle M on the target vehicle traveling road, and a three-dimensional object such as a bicycle or a pedestrian rushing out from the side of the road. The traveling ECU 14 determines a possibility of collision between the target vehicle M and each extracted three-dimensional object. Among the three-dimensional objects having a strong possibility of collision with the target vehicle M, the traveling ECU 14 sets the three-dimensional object closest to the target vehicle M as the braking target Trg of the driver's brake operation.

When the braking target is set in Step S304, the traveling ECU 14 acquires, in Step S305, a time-to-collision TTC at the start of the driver's brake operation against the braking target.

In Step S306, the traveling ECU 14 checks whether the time-to-collision TTC at the start of the brake operation is shorter than the preset threshold TTCx_range.

When determination is made in Step S306 that the time-to-collision TTC is equal to or longer than the threshold TTCx_range, the traveling ECU 14 terminates the routine.

Figure 8:
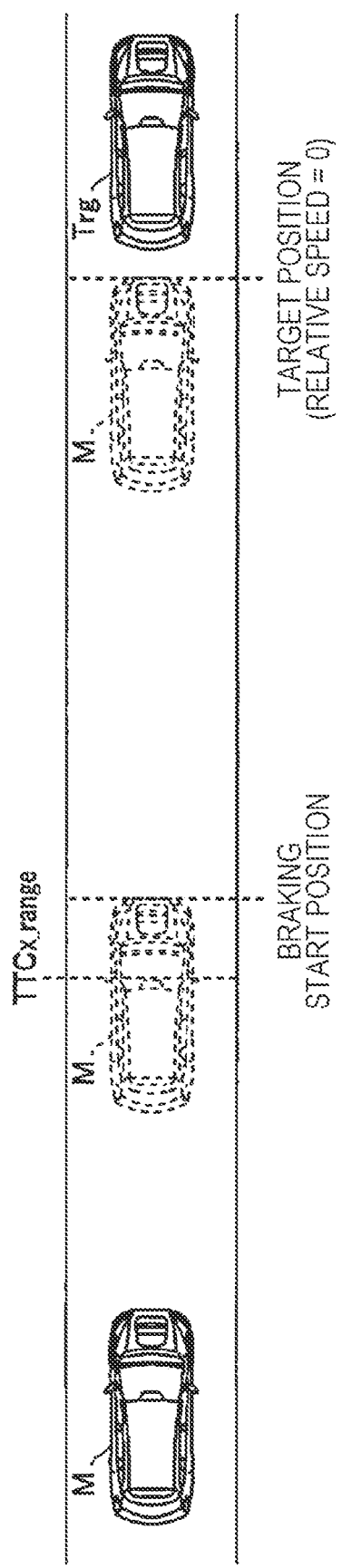
FIG. 8 is an explanatory diagram illustrating behavior of the vehicle during braking force assisting control.

When determination is made in Step S306 that the time-to-collision TTC is shorter than the threshold TTCx_range (see FIG. 8), the traveling ECU 14 proceeds to Step S307 to check whether a brake fluid pressure learning value associated with a relative speed Vrel at the start of the brake operation is higher than the current brake fluid pressure.

When determination is made in Step S307 that the brake fluid pressure learning value is equal to or lower than the current brake fluid pressure, the traveling ECU 14 proceeds to Step S310.

When determination is made in Step S307 that the brake fluid pressure learning value is higher than the current brake fluid pressure, the traveling ECU 14 proceeds to Step S308 to check whether a fluid pressure jerk learning value associated with the relative speed Vrel at the start of the brake operation is higher than the current fluid pressure jerk.

When determination is made in Step S308 that the fluid pressure jerk learning value is equal to or lower than the current fluid pressure jerk, the traveling ECU 14 proceeds to Step S310 by determining that the driver intends to increase the braking force.

When determination is made in Step S308 that the fluid pressure jerk learning value is higher than the current fluid pressure jerk, the traveling ECU 14 proceeds to Step S309 to execute brake fluid pressure control.

Figure 6:
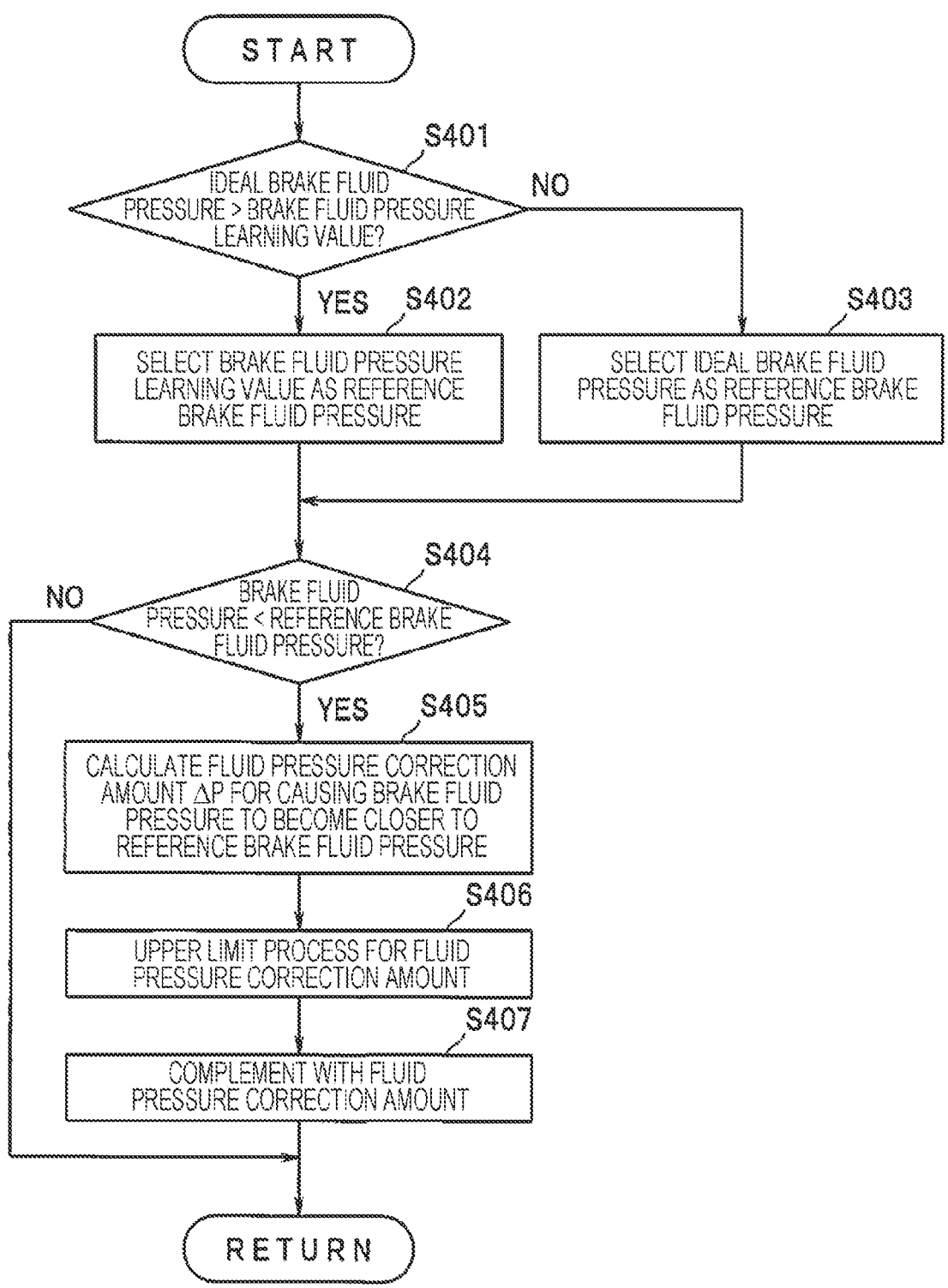
FIG. 6 is a flowchart illustrating a brake fluid pressure control subroutine.

For example, the brake fluid pressure control is executed with reference to a flowchart of a brake fluid pressure control subroutine in FIG. 6.

When the subroutine is started, the traveling ECU 14 checks in Step S401 whether the ideal brake fluid pressure associated with the current relative speed Vrel between the target vehicle M and the braking target Trg is higher than the brake fluid pressure learning value.

When determination is made in Step S401 that the ideal brake fluid pressure is higher than the brake fluid pressure learning value (see FIG. 10), the traveling ECU 14 proceeds to Step S402 to set the brake fluid pressure learning value as a reference brake fluid pressure, and then proceeds to Step S404.

When determination is made in Step S401 that the ideal brake fluid pressure is equal to or lower than the brake fluid pressure learning value (see FIG. 9), the traveling ECU 14 proceeds to Step S403 to set the ideal brake fluid pressure as the reference brake fluid pressure, and then proceeds to Step S404.

In Step S404 from Step S402 or S403, the traveling ECU 14 checks whether the current brake fluid pressure is lower than the reference brake fluid pressure.

When determination is made in Step S404 that the current brake fluid pressure is equal to or higher than the reference brake fluid pressure, the traveling ECU 14 terminates the subroutine by determining that the braking force is sufficiently generated.

Figure 9:
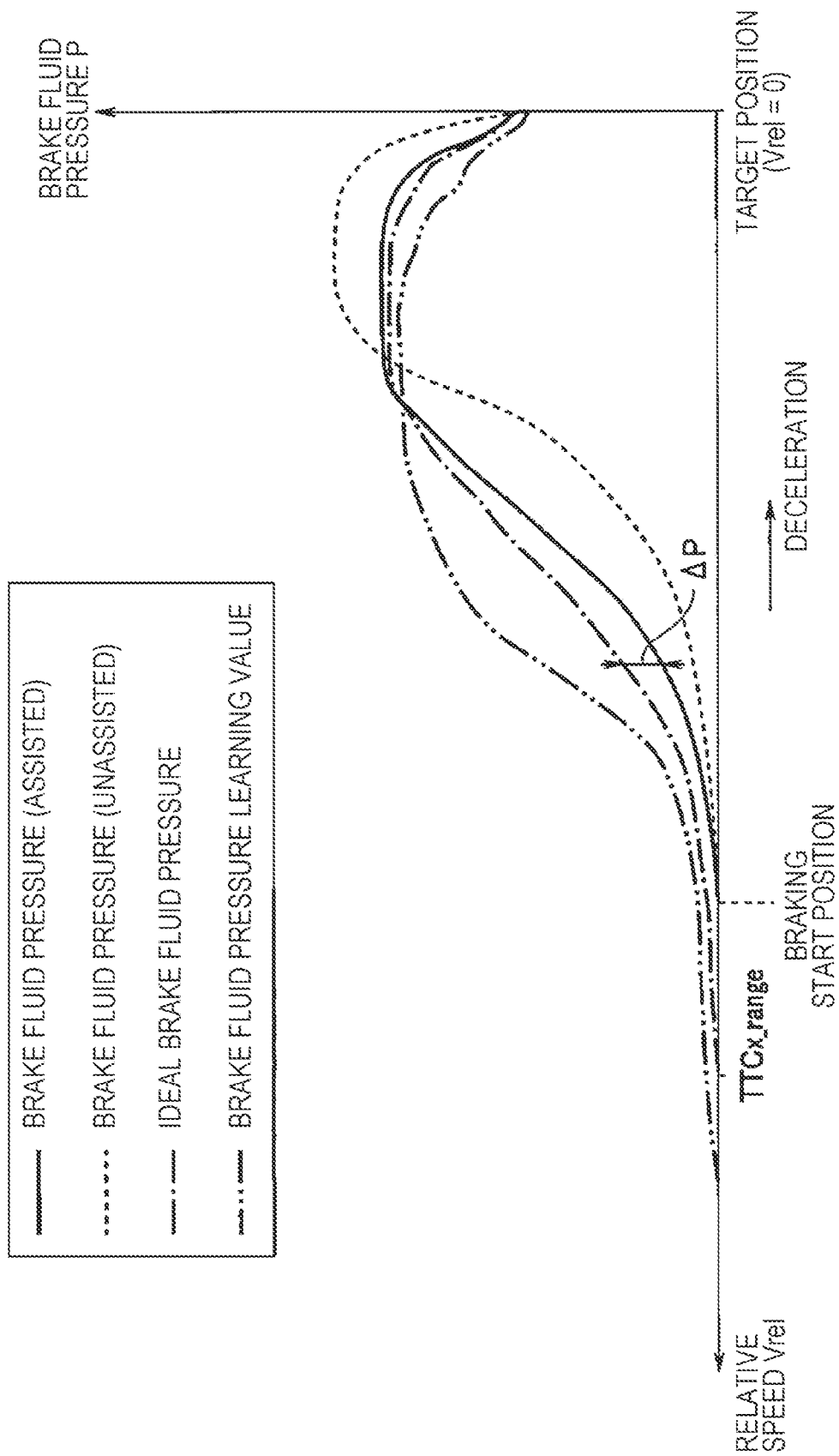
FIG. 9 is a characteristic diagram illustrating brake fluid pressures, an ideal brake fluid pressure, and a brake fluid pressure learning value.
Figure 10:
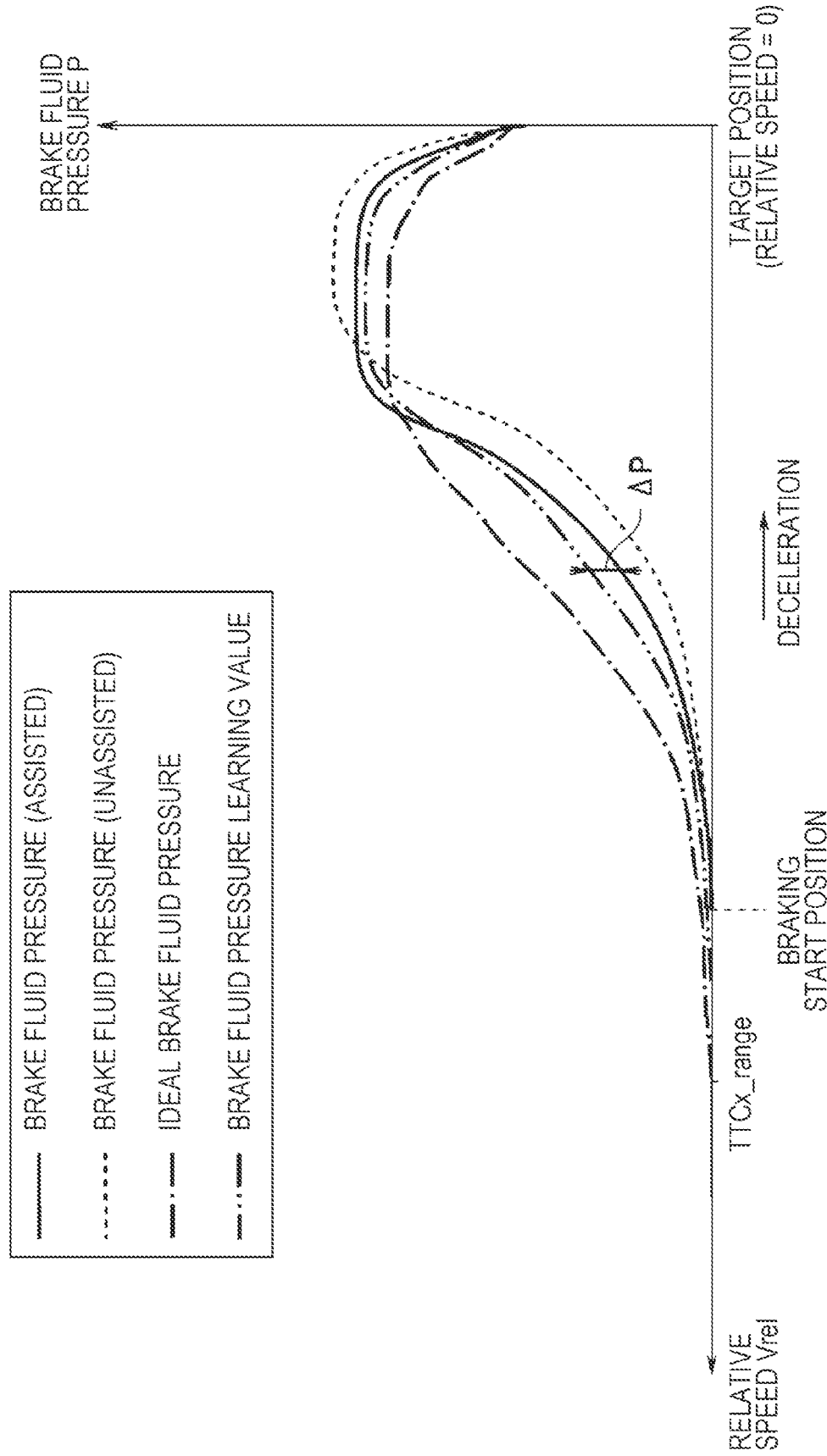
FIG. 10 is a characteristic diagram illustrating the brake fluid pressures, the ideal brake fluid pressure, and the brake fluid pressure learning value.

When determination is made in Step S404 that the current brake fluid pressure is lower than the reference brake fluid pressure, the traveling ECU 14 proceeds to Step S405 to calculate a fluid pressure correction amount $\Delta P$ for causing the brake fluid pressure to become closer to the reference brake fluid pressure (see FIGS. 9 and 10).

In Step S406, the traveling ECU 14 executes an upper limit process for the fluid pressure correction amount ΔP by using a preset upper limit value.

In Step S407, the traveling ECU 14 complements the current brake fluid pressure with the fluid pressure correction amount ΔP subjected to the upper limit process, and then terminates the subroutine.

Figure 5:
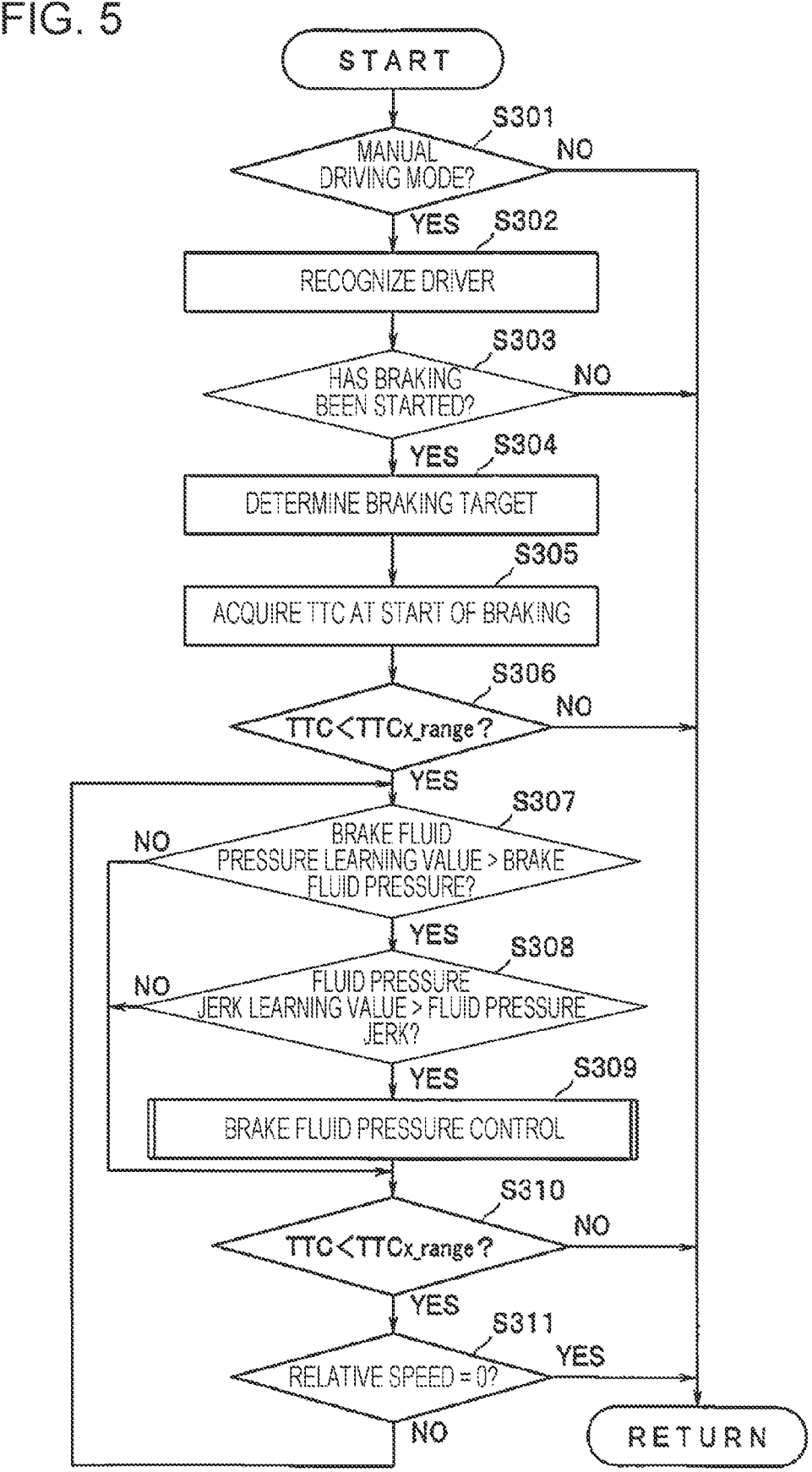
FIG. 5 is a flowchart illustrating a braking force assisting control routine.

In the main routine of FIG. 5, the traveling ECU 14 checks in Step S310 from Step S307, S308, or S309 whether the time-to-collision TTC remains shorter than the threshold TTCx_range.

When determination is made in Step S310 that the time-to-collision TTC is equal to or longer than the threshold TTCx_range, the traveling ECU 14 terminates the routine by determining that the braking force assisting control is not expected.

When determination is made in Step S310 that the time-to-collision TTC remains shorter than the threshold TTCx_range, the traveling ECU 14 proceeds to Step S311 to check whether the relative speed Vrel between the target vehicle M and the braking target Trg has reached "0".

When determination is made in Step S311 that the relative speed Vrel has reached "0", the traveling ECU 14 terminates the routine by determining that the braking against the braking target Trg has finished.

When determination is made in Step S311 that the relative speed Vrel is higher than "0", the traveling ECU 14 returns to Step S307.

According to the embodiment, when the driver has performed the brake operation against the braking target Trg recognized ahead based on the traveling environment information at the timing when the time-to-collision TTC between the target vehicle M and the braking target Trg is equal to or longer than the threshold TTCx_range, the traveling ECU 14 acquires the brake fluid pressure learning value based on the brake fluid pressure generated from the start to the end of the braking performed by the brake operation. When the driver has started the brake operation at the timing when the time-to-collision TTC is shorter than the threshold TTCX_range, the traveling ECU 14 complements, based on the brake fluid pressure learning value, the brake fluid pressure generated from the start to the end of the braking performed by the brake operation. Thus, it is possible to generate an appropriate braking force in the case where the timing to depress the brake pedal by the driver is late during the manual driving mode.

That is, in the case where the timing to depress the brake pedal by the driver is late, the lack of the brake fluid pressure (lack of the braking force) due to the late depression timing is compensated while leaving the driver to decide the timing to start the braking against the braking target. Thus, it is possible to generate an appropriate braking force that matches the driver's feeling.

The brake fluid pressure (braking force) is complemented based on the brake fluid pressure learning value acquired based on the driver's brake operation. Thus, the complementing operation matches the driver's feeling.

In this case, the traveling ECU 14 stores the preset ideal brake fluid pressure characteristic (ideal braking force characteristic) from the start to the end of the braking, and complements the brake fluid pressure based on the ideal brake fluid pressure characteristic when the ideal brake fluid pressure is relatively lower than the brake fluid pressure learning value. Thus, the brake fluid pressure can be complemented minimally instead of being complemented excessively.

The traveling ECU 14 does not complement the brake fluid pressure after the current brake fluid pressure has exceeded either one of the brake fluid pressure learning value and the ideal brake fluid pressure, for example, in FIGS. 9 and 10. Thus, the brake fluid pressure can be complemented while giving discretion to increase the intensity of the driver's voluntary brake operation.

In the embodiment described above, the IPU 12, the image recognition ECU 13, the traveling ECU 14, the CP_ECU 21, the E/G_ECU 22, the T/M_ECU 23, the BK_ECU 24, and the PS_ECU 25 are each implemented by a known microcomputer including a CPU, a RAM, a ROM, and a non-volatile storage and peripheral devices around the microcomputer. The ROM prestores programs to be executed by the CPU and fixed data such as data tables. All or a part of the functions of the processor may be implemented by a logic or analog circuit, and processes in various programs may be implemented by an electronic circuit such as an FPGA.

The embodiment of the disclosure is not limited to the embodiment described above, and various modifications may be made without departing from the gist in the implementation. The embodiment includes various aspects of the disclosure that may be extracted by any appropriate combination of a plurality of disclosed constituent elements.

For example, the embodiment described above is directed to the example in which the driving assistance device 1 is applied to the engine vehicle that travels by using the driving force of the engine. For example, the driving assistance device 1 is also applicable to either one of a hybrid vehicle and an electric vehicle. In this case, the traveling ECU 14 can acquire, as the braking force characteristic learning value, a regenerative torque characteristic learning value and a regenerative torque jerk characteristic learning value in addition to the brake fluid pressure learning value and the fluid pressure jerk learning value. The braking force can be complemented by using the regenerative torque in addition to the brake fluid pressure.

Some of the constituent elements in the embodiment may be omitted as long as the problems described above can be solved and the effects described above can be attained.

The traveling ECU 14 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the traveling ECU 14. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A driving assistance device for a vehicle, the driving assistance device comprising at least one processor programmed to:
   recognize traveling environment information outside the vehicle;
   recognize a braking target ahead of the vehicle based on the traveling environment information;
   set a timing based on a correlation between the vehicle and the braking target;
   determine that a driver who drives the vehicle has started a brake operation against the recognized braking target before the timing set based on the correlation between the vehicle and the braking target; and
   in response to determining that the driver has started the brake operation before the timing set based on the correlation, acquire a braking force characteristic learning value based on a braking force generated from start to end of braking performed by the brake operation;
   in a case where the driver has started the brake operation after the set timing, complement the braking force based on the braking force characteristic learning value; and
   control brake fluid pressures to be output to brake wheel cylinders.

2. The driving assistance device for the vehicle according to claim 1, wherein the braking force characteristic learning value is acquired for each driver who drives the vehicle.

3. The driving assistance device for the vehicle according to claim 1, wherein the braking force characteristic learning value is acquired for each range of a relative speed between the vehicle and the braking target at a timing when the driver has started the brake operation.

4. The driving assistance device for the vehicle according to claim 2, wherein the braking force characteristic learning value is acquired for each range of a relative speed between the vehicle and the braking target at a timing when the driver has started the brake operation.

5. The driving assistance device for the vehicle according to claim 1, further comprising a storage configured to store a preset braking force characteristic from the start to the end of the braking,
   wherein the at least one processor is configured to, in a case where a value of the preset braking force characteristic is less than the braking force characteristic learning value, complement the braking force based on the preset braking force characteristic in place of the braking force characteristic learning value.

6. The driving assistance device for the vehicle according to claim 2, further comprising a storage configured to store a preset braking force characteristic from the start to the end of the braking,
   wherein the at least one processor is configured to, in a case where a value of the preset braking force characteristic is less than the braking force characteristic learning value, complement the braking force based on the preset braking force characteristic in place of the braking force characteristic learning value.

7. The driving assistance device for the vehicle according to claim 3, further comprising a storage configured to store a preset braking force characteristic from the start to the end of the braking,
   wherein the at least one processor is configured to, in a case where a value of the preset braking force characteristic is less than the braking force characteristic learning value, complement the braking force based on the preset braking force characteristic in place of the braking force characteristic learning value.

8. The driving assistance device for the vehicle according to claim 4, further comprising a storage configured to store a preset braking force characteristic from the start to the end of the braking,
   wherein the at least one processor is configured to, in a case where a value of the preset braking force characteristic is less than the braking force characteristic learning value, complement the braking force based on the preset braking force characteristic in place of the braking force characteristic learning value.

9. The driving assistance device for the vehicle according to claim 5, wherein the preset braking force characteristic is set for each preset range of a relative speed between the vehicle and the braking target.

10. The driving assistance device for the vehicle according to claim 6, wherein the preset braking force characteristic is set for each preset range of a relative speed between the vehicle and the braking target.

11. The driving assistance device for the vehicle according to claim 7, wherein the preset braking force characteristic is set for each preset range of a relative speed between the vehicle and the braking target.

12. The driving assistance device for the vehicle according to claim 8, wherein the preset braking force characteristic is set for each preset range of a relative speed between the vehicle and the braking target.

13. A driving assistance device for a vehicle, the driving assistance device comprising circuitry configured to:
   recognize traveling environment information outside the vehicle,
   recognize a braking target ahead of the vehicle based on the traveling environment information;
   set a timing based on a correlation between the vehicle and the braking target;
   determine that a driver who drives the vehicle has started a brake operation against the recognized braking target before the timing set based on the correlation between the vehicle and the braking target;
   in response to determining that the driver has started the brake operation before the timing set based on the correlation, acquire a braking force characteristic learning value based on a braking force generated from start to end of braking performed by the brake operation;
   in a case where the driver has started the brake operation after the set timing, complement the braking force based on the braking force characteristic learning value; and
   control brake fluid pressures to be output to brake wheel cylinders.

* * * * *